(12) United States Patent
Uchida et al.

(10) Patent No.: US 12,417,483 B2
(45) Date of Patent: Sep. 16, 2025

(54) PORTABLE TERMINAL, SYSTEM, PROCESSING METHOD, AND NON-TRANSITORY STORAGE MEDIUM

(71) Applicant: NEC Corporation, Tokyo (JP)

(72) Inventors: Keita Uchida, Tokyo (JP); Akihiko Ishii, Tokyo (JP)

(73) Assignee: NEC CORPORATION, Tokyo (JP)

( * ) Notice: Subject to any disclaimer, the term of this patent is extended or adjusted under 35 U.S.C. 154(b) by 270 days.

(21) Appl. No.: 18/123,010

(22) Filed: Mar. 17, 2023

(65) Prior Publication Data
US 2023/0342835 A1   Oct. 26, 2023

(30) Foreign Application Priority Data

Apr. 22, 2022   (JP) .................................. 2022-070646

(51) Int. Cl.
*G06Q 30/00* (2023.01)
*G06F 3/0482* (2013.01)
*G06Q 30/0601* (2023.01)
*G06T 11/20* (2006.01)

(52) U.S. Cl.
CPC ....... *G06Q 30/0633* (2013.01); *G06F 3/0482* (2013.01); *G06Q 30/0631* (2013.01); *G06T 11/206* (2013.01)

(58) Field of Classification Search
CPC .............................................. G06Q 30/06–08
See application file for complete search history.

(56) References Cited

U.S. PATENT DOCUMENTS

| 2006/0085217 | A1* | 4/2006 | Grace | G06Q 10/10 |
| | | | | 705/320 |
| 2011/0107265 | A1* | 5/2011 | Buchanan | G06Q 30/02 |
| | | | | 715/835 |
| 2022/0237681 | A1* | 7/2022 | Cai | G06N 20/00 |
| 2022/0270145 | A1* | 8/2022 | Thawait | G06F 16/2379 |

FOREIGN PATENT DOCUMENTS

| JP | 2015-210743 A | 11/2015 |
| JP | 2021-108136 A | 7/2021 |
| JP | 2021-152771 A | 9/2021 |

OTHER PUBLICATIONS

"On the Top Shelf//Best Sellers by Genre", USA Today, Dec. 21, 1994, 07D (Year: 1994).*

* cited by examiner

*Primary Examiner* — Ethan D Civan
(74) *Attorney, Agent, or Firm* — Sughrue Mion, PLLC

(57) ABSTRACT

To enable a user to easily recognize a content of registration in a technique for performing registration and settlement processing of a product to be settled by using a portable terminal. The present invention provides a portable terminal 10 including: an input acceptance unit 11 that accepts an input of product identification information of a product to be settled; a list generation unit 12 that generates, based on the input, a list of products to be settled; a graph generation unit 13 that generates a graph relating to a content of the list; and a display control unit 14 that displays a screen including the graph on a display unit 17.

14 Claims, 15 Drawing Sheets

FIG. 4

LIST OF PRODUCTS TO BE SETTLED

| NUMBER | PRODUCT IDENTIFICATION INFORMATION | PRODUCT NAME | UNIT PRICE | QUANTITY | PRODUCT CATEGORY | SPECIAL SALE FLAG | ... |
|---|---|---|---|---|---|---|---|
| 1 | 17······ | BLACK CHOCOLATE | 318 | 1 | FOOD | — | ... |
| ···· | ···· | ···· | ···· | ···· | ···· | ···· | ···· |

FIG. 10

LIST OF PRODUCTS TO BE SETTLED

| NUMBER | PRODUCT IDENTIFICATION INFORMATION | PRODUCT NAME | UNIT PRICE | QUANTITY | PRODUCT CATEGORY | SPECIAL SALE FLAG | FOR WHOM | ... |
|---|---|---|---|---|---|---|---|---|
| 1 | 17····· | BLACK CHOCOLATE | 318 | 1 | FOOD | — | FATHER | ··· |
| 2 | 38····· | TAIYO NO MILK | 218 | 1 | FOOD | ✓ | ME | ··· |
| ···· | ···· | ···· | ···· | ···· | ···· | ···· | ···· | ···· |

PORTABLE TERMINAL, SYSTEM, PROCESSING METHOD, AND NON-TRANSITORY STORAGE MEDIUM

TECHNICAL FIELD

The present invention relates to a portable terminal, a system, a processing method, and a program.

BACKGROUND ART

A technique relevant to the present invention is disclosed in Japanese Patent Application Publication No. 2021-152771, Japanese Patent Application Publication No. 2021-108136, and Japanese Patent Application Publication No. 2015-210743.

Japanese Patent Application Publication No. 2021-152771 discloses a technique for performing registration and settlement processing of a product to be settled by using a portable terminal lent to a user from a store or a portable terminal possessed by a user in shopping in an actual store.

Japanese Patent Application Publication No. 2021-108136 discloses a technique for a user to simply recognize a value of own belongings, and for indicating a proportion of values of a plurality of categories by means of a pie chart.

Japanese Patent Application Publication No. 2015-210743 discloses a technique relating to a household account, and for indicating a proportion of purchase prices of a plurality of categories by means of a pie chart.

DISCLOSURE OF THE INVENTION

In a technique for performing registration and settlement processing of a product to be settled, a means for enabling a user to recognize a content of registration is necessary.

In a prior art using a stationary-type point of sales (POS) terminal, information such as, for example, a list, a total price, or the like of products registered as a product to be settled is displayed on a display.

The present inventor has examined a means for enabling the user to recognize a content of registration in a technique for performing registration and settlement processing of a product to be settled by using a portable terminal as in the technique disclosed in Japanese Patent Application Publication No. 2021-152771, and, as a result, has newly found out a problem as follows.

In comparison with a stationary-type POS terminal, a portable terminal has a small display that displays information for a user. Thus, when information displayed on the stationary-type POS terminal is displayed as is on the portable terminal, an amount of information becomes excessive relative to a size of the display, which may cause inconvenience such as illegibility. Japanese Patent Application Publication No. 2021-152771 does not disclose the problem and a solution thereof.

Japanese Patent Application Publication No. 2021-108136 is a technique for a user to simply recognize a value of own belongings, and is not a technique relating to registration and settlement processing of a product to be settled. Japanese Patent Application Publication No. 2015-210743 is a technique relating to a household account, and is not a technique relating to registration and settlement processing of a product to be settled.

In view of the above-described problem, one example of an object of the present invention is to provide a portable terminal, a system, a processing method, and a program that solve a problem of enabling a user to easily recognize a content of registration in a technique for performing registration and settlement processing of a product to be settled by using a portable terminal.

According to one aspect of the present invention, provided is a processing method including,
by a computer:
  accepting an input of product identification information of a product to be settled;
  generating, based on the input, a list of products to be settled;
  generating a graph relating to a content of the list; and
  displaying a screen including the graph on a display unit.

According to one aspect of the present invention, provided is a portable terminal including:
  an input acceptance unit that accepts an input of product identification information of a product to be settled;
  a list generation unit that generates, based on the input, a list of products to be settled;
  a graph generation unit that generates a graph relating to a content of the list; and
  a display control unit that displays a screen including the graph on a display unit.

According to one aspect of the present invention, provided is a program causing a computer to function as:
  an input acceptance unit that accepts an input of product identification information of a product to be settled;
  a list generation unit that generates, based on the input, a list of products to be settled;
  a graph generation unit that generates a graph relating to a content of the list; and
  a display control unit that displays a screen including the graph on a display unit.

According to one aspect of the present invention, provided is a system including:
  an input acceptance unit that accepts an input of product identification information of a product to be settled;
  a list generation unit that generates, based on the input, a list of products to be settled;
  a graph generation unit that generates a graph relating to a content of the list; and
  a display control unit that displays a screen including the graph on a display unit.

According to one aspect of the present invention, a portable terminal, a system, a processing method, and a program that solve a problem of enabling a user to easily recognize a content of registration in a technique for performing registration and settlement processing of a product to be settled by using a portable terminal are achieved.

BRIEF DESCRIPTION OF THE DRAWINGS

The above-described object and other objects, features, and advantageous effects become more apparent from the preferred example embodiments described below and the following accompanying drawings.

FIG. 4 is a diagram schematically illustrating one example of information processed by the terminal apparatus.

FIG. 10 is a diagram schematically illustrating one example of information processed by the terminal apparatus.

DESCRIPTION OF EMBODIMENTS

Hereinafter, example embodiments of the present invention will be described below by using drawings. Note that, in every drawing, a similar component is given a similar signs, and description thereof is omitted as appropriate.

First Example Embodiment

Figure 1:
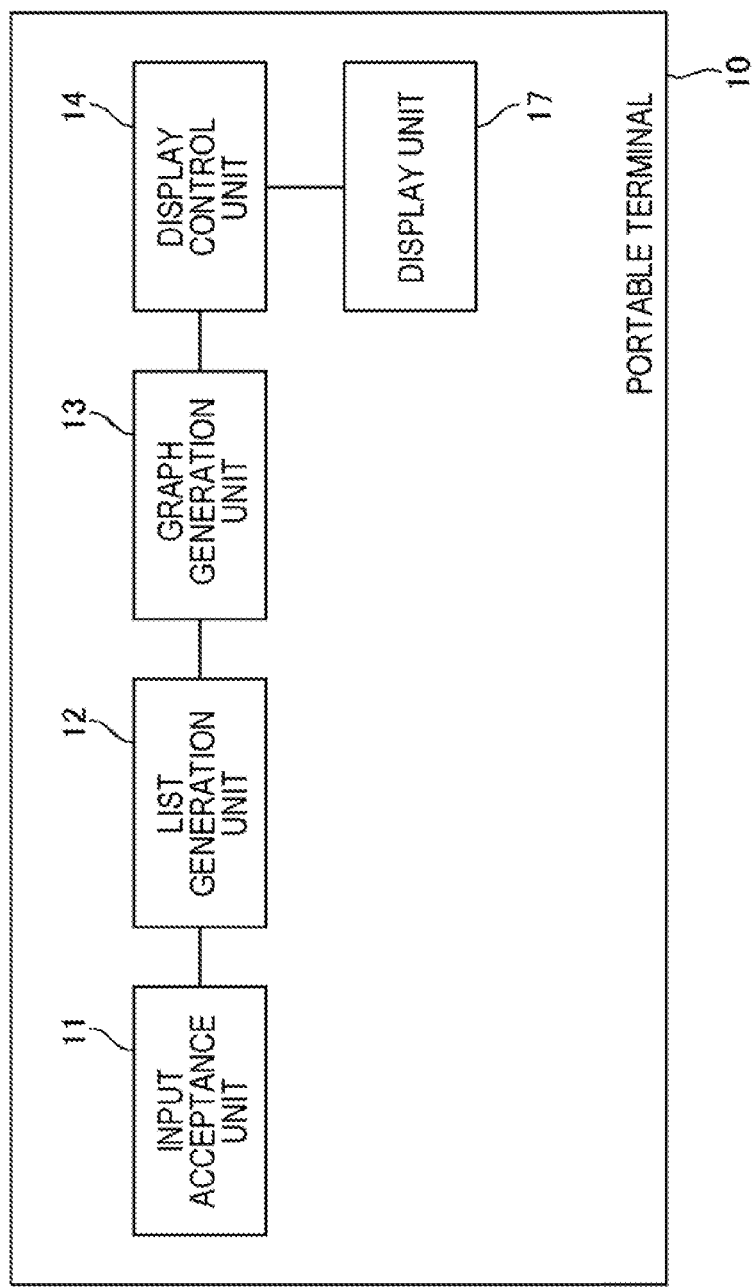
FIG. 1 is a diagram illustrating one example of a function block diagram of a portable terminal.

FIG. 1 is a function block diagram illustrating an overview of a portable terminal 10 according to a first example embodiment. The portable terminal 10 includes an input acceptance unit 11, a list generation unit 12, a graph generation unit 13, and a display control unit 14. The above function units are achieved in the portable terminal 10 by installing a predetermined program on the portable terminal 10. The portable terminal 10 can further include a display unit 17.

The input acceptance unit 11 accepts an input of product identification information of a product to be settled. The list generation unit 12 generates, based on the input, a list of products to be settled. The graph generation unit 13 generates a graph relating to a content of the list. The display control unit 14 displays a screen including the graph on the display unit 17.

The portable terminal 10 including such a configuration solves a problem of enabling a user to easily recognize a content of registration in a technique for performing registration and settlement processing of a product to be settled by using the portable terminal 10.

Second Example Embodiment

"Overview"

A portable terminal 10 according to a second example embodiment is a more specific embodiment of the portable terminal 10 according to the first example embodiment. In the present example embodiment, each customer shopping in an actual store possesses the portable terminal 10, and performs, while picking up a product, an operation of registering, by his/herself, a product to be settled by using the portable terminal 10.

Figure 2:
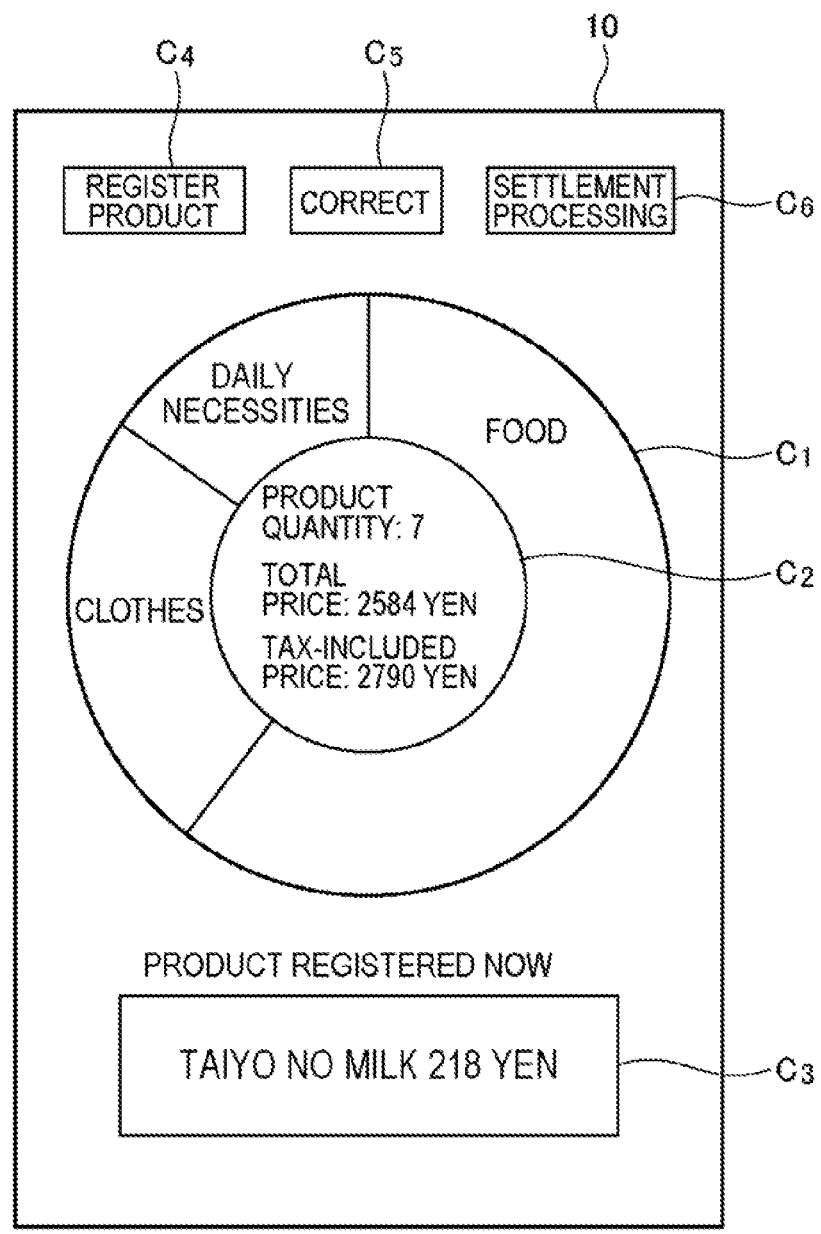
FIG. 2 is a diagram illustrating one example of a screen displayed on a display by a portable terminal.

The portable terminal 10 displays, on a display, a pie chart $C_1$ as illustrated in FIG. 2, while a user performs registration and settlement processing of a product to be settled, which will be described later in detail. The illustrated pie chart $C_1$ relates to a product registered as a product to be settled, and indicates a proportion of purchase prices of a plurality of categories. When a product is newly registered as a product to be settled, a content of the pie chart $C_1$ is updated accordingly. A user can recognize a whole picture of a content of registration, based on the pie chart $C_1$ as described above, while performing registration and settlement processing of a product by using the portable terminal 10.

"Hardware Configuration"

Next, one example of a hardware configuration of the portable terminal 10 will be described. The portable terminal 10 may be a terminal apparatus for general use such as, for example, a smartphone, a tablet terminal, a smartwatch, or a mobile phone, or may be a terminal apparatus designed and made dedicatedly for the use. The portable terminal 10 may be a terminal possessed by a user (a customer who comes to a store). Further, the portable terminal 10 may be a terminal possessed by a store and lent to a customer who comes to the store.

Each function unit of the portable terminal 10 is achieved by any combination of hardware and software, mainly including a central processing unit (CPU) of any computer, a memory, a program to be loaded in a memory, a storage unit (in which a program downloaded from a storage medium such as a compact disc (CD), a server on the Internet, or the like can be stored as well as a program stored in advance in a stage of shipping an apparatus) such as a hard disk for storing the program, and an interface for network connection. In addition, it should be understood by a person skilled in the art that there are a variety of modified examples of a method or an apparatus for achieving the same.

Figure 3:
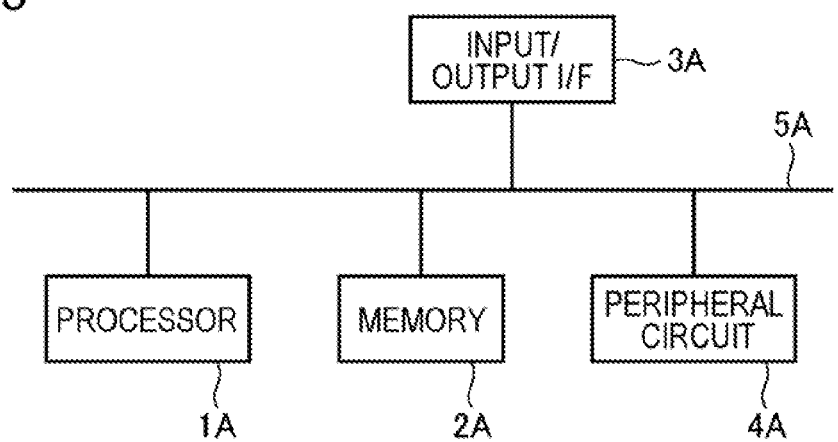
FIG. 3 is a diagram illustrating one example of a hardware configuration of a terminal apparatus.

FIG. 3 is a block diagram illustrating a hardware configuration of the portable terminal 10. As illustrated in FIG. 3, the portable terminal 10 includes a processor 1A, a memory 2A, an input/output interface 3A, a peripheral circuit 4A, and a bus 5A. The peripheral circuit 4A includes various modules. The portable terminal 10 may not include the peripheral circuit 4A.

Note that, the portable terminal 10 may be configured by a plurality of physically and/or logically separated apparatuses. In this case, each of the plurality of apparatuses can include the above hardware configuration.

The bus 5A is a data transmission path through which the processor 1A, the memory 2A, the peripheral circuit 4A, and the input/output interface 3A transmit and receive data to and from one another. The processor 1A is an arithmetic processing apparatus such as, for example, a CPU or a graphics processing unit (GPU). The memory 2A is a memory such as, for example, a random access memory (RAM) or a read only memory (ROM). The input/output interface 3A includes an interface for acquiring information from an input apparatus, an external apparatus, an external server, an external sensor, a camera, and the like, an interface for outputting information to an output apparatus, an external apparatus, an external server, and the like, and the like. The input apparatus is, for example, a keyboard, a mouse, a microphone, a physical button, a touch panel, and the like. The output apparatus is, for example, a display, a speaker, a printer, a mailer, and the like. The processor 1A can give an instruction to each module to perform an arithmetic operation, based on an arithmetic operation result thereof "Function Configuration"

Next, a function configuration of the portable terminal 10 according to the second example embodiment will be described in detail. FIG. 1 illustrates one example of a function block diagram of the portable terminal 10. As illustrated, the portable terminal 10 includes an input acceptance unit 11, a list generation unit 12, a graph generation unit 13, and a display control unit 14. The above function units are achieved in the portable terminal 10 by installing a predetermined program on the portable terminal 10. The portable terminal 10 can further include a display unit 17.

The input acceptance unit 11 accepts an input of product identification information of a product to be settled. Upon picking up a product to be purchased from a display shelf, a user performs an operation of inputting product identification information of the product to the portable terminal 10. The input acceptance unit 11 acquires the product identification information input in the operation.

Accepting an input of product identification information can be achieved by using every possible technique. For example, the portable terminal 10 may include a function of reading a code (a barcode, a two-dimensional code, or the like) attached to a product. Then, inputting product identification information of a product may be achieved by an operation of causing the portable terminal 10 to read the code. Besides the above, inputting product identification information of a product may be achieved by an operation of manually inputting product identification information by using an input apparatus such as a touch panel or a physical button included in the portable terminal 10. Besides the above, the portable terminal 10 may include a microphone and a voice recognition function. Then, inputting product identification information of a product may be achieved by an operation of vocally inputting product identification information to the portable terminal 10.

The list generation unit 12 generates, based on the input accepted by the input acceptance unit 11, a list of products to be settled (hereinafter, may be referred to simply as a "list"). When the input acceptance unit 11 accepts a new input of product identification information, the list generation unit 12 updates the list according to the new input.

First, when acquiring product identification information accepted by the input acceptance unit 11, the list generation unit 12 transmits, to a store server, a request for product information associated with the product identification information. In the store server, a product master in which product identification information, a product name, a unit price, a product category, special sale information, and the like of a product being handled in a store are associated with one another is registered. When receiving the request transmitted by the portable terminal 10, the store server extracts, from the product master, product information associated with the received product identification information, and transmits the product information to the portable terminal 10. Subsequently, the list generation unit 12 registers the product information received from the store server in the list. The product information includes at least a part of information associated with the product identification information in the product master. The transmission and reception of data are achieved via a communication network such as the Internet.

FIG. 4 schematically illustrates one example of a list generated by the list generation unit 12. In the illustrated example, a number, product identification information, a product name, a unit price, a quantity, a product category, and a special sale flag are associated with one another. The number is a serial number for mutually identifying a product included in the list. The special sale flag is a flag indicating whether the product is a special sale product. The special sale product is a product that is sold at a lower unit price than usual. In the illustrated example, "food" is indicated as one example of the product category, but the product category has various ways of classification and is not limited thereto.

For example, "food" may be further finely classified such as "confectionery", "vegetables", "meat", "seafood", and "daily dishes", and each may be one product category.

Note that, a list generated by the list generation unit 12 may include, in addition to registered product information, a total quantity of products included in the list, a total price of products included in the list, a tax-included price being a total price with tax, and the like.

Returning to FIG. 1, the graph generation unit 13 generates a graph relating to a content of the list generated by the list generation unit 12. The graph according to the present example embodiment is a pie chart.

For example, the graph generation unit 13 classifies a product included in the list into a plurality of categories. Then, the graph generation unit 13 generates a pie chart, based on a result of classification.

First, processing of classifying a product included in the list into a plurality of categories will be described.

The graph generation unit 13 can execute at least one of:
processing of classifying a product included in the list by product category;
processing of classifying a product included in the list into two categories of food and non-food;
processing of classifying a product included in the list into two categories of a special sale product and a non-special sale product; and
processing of classifying a product included in the list into a plurality of categories according to a selling price.

A range for "a plurality of categories according to a selling price" is defined by a price range, such as, for example, "1000 yen or under", "1001 yen to 3000 yen", "3001 yen to 10000 yen", or "10001 yen or above".

The graph generation unit 13 can execute classification as described above, based on product information acquired by the list generation unit 12.

Next, processing of generating a pie chart based on a result of classification will be described.

The graph generation unit 13 can generate at least one of a pie chart indicating a proportion of purchase prices of a plurality of categories and a pie chart indicating a proportion of purchase quantities of a plurality of categories.

The display control unit 14 generates a screen including the graph generated by the graph generation unit 13, and displays the screen on the display unit 17. The display unit 17 is a display. That is, the screen is displayed on the display of the portable terminal 10.

FIG. 2 illustrates one example of a screen generated by the display control unit 14 and displayed on the display unit 17. In the illustrated screen, the pie chart $C_1$ generated by the graph generation unit 13 is displayed. The illustrated pie chart $C_1$ indicates a proportion of purchase prices of a plurality of categories (food, clothes, and daily necessities). A proportion in size of areas associated with a plurality of categories on the pie chart $C_1$ indicates a proportion of purchase prices of a plurality of categories. Note that, areas associated with a plurality of categories on the pie chart $C_1$ may be identifiably displayed by different colors or the like.

Then, in the illustrated screen, a space $C_2$ is provided on a center of the pie chart $C_1$, and a total quantity of products included in the list, a total price of products included in the list, and a tax-included price being a total price with tax are displayed in the space $C_2$. Note that, the display control unit 14 may change a size of a circle of the pie chart $C_1$ according to a total quantity, a total price, or a tax-included price at the point in time. For example, the display control unit 14 can enlarge a circle of the pie chart $C_1$ as a total quantity, a total price, or a tax-included price becomes larger.

Furthermore, in the illustrated screen, a space $C_3$ for notifying a user of a product newly added to the list in response to an input of product identification information is provided. In the space $C_3$, information on a product newly added to the list, for example, a product name, a unit price, and the like are displayed. The display control unit 14 may continue display in the space $C_3$ until a new product is next added to the list, and, in response to the addition, may switch the display to information on the new product next added to the list. Besides the above, the display control unit 14 may clear display in the space $C_3$ after a lapse of a predetermined period of time from the display.

Note that, information displayed in the space $C_2$ and information displayed in the space $C_3$ may be reversed in the example illustrated in FIG. 2. That is, the display control unit 14 may display information on a product newly added to the list in the space $C_2$, and may display a total price or the like of products included in the list in the space $C_3$.

Besides the above, both of the above may be displayed in the space $C_2$. The display control unit 14 may switch display in the space $C_2$ between information on a product newly added to the list and a total price or the like of products. For example, when a product is newly added to the list in response to an input of product identification information, the display control unit 14 may display information on the product newly added to the list in the space $C_2$ for only a predetermined period of time therefrom, and may display a total price or the like of products included in the list in the space $C_2$ for other times. By doing so, a space for displaying information on a product newly added to the list and a total price or the like of products can be reduced, which allows the pie chart $C_1$ to be displayed larger.

Furthermore, in the illustrated screen, a product registration button $C_4$ for newly inputting product identification information is provided. When the product registration button $C_4$ is touched, for example, a function of reading a code is activated and at least a part of the display becomes a finder. For example, the entire display may become a finder, or a part of the display may become a finder. In a latter case, a part of information (example: the pie chart $C_1$ and the space $C_2$) illustrated in FIG. 2 may be displayed in a part other than the finder of the display. A user causes the portable terminal 10 to read a code attached to a product, by making a settlement or the like in such a way that the code comes to a predetermined position of the finder.

Furthermore, in the illustrated screen, a correction button $C_5$ for correcting a content of the list is provided. The portable terminal 10 starts processing of correcting the list in response to touching of the correction button $C_5$. The processing of correcting the list will be described later.

Furthermore, in the illustrated screen, a settlement processing button $C_6$ for starting settlement processing is provided. The portable terminal 10 starts settlement processing in response to touching of the settlement processing button $C_6$. The settlement processing will be described later.

The input acceptance unit 11 may accept an input of selecting one category from among a plurality of categories displayed in the pie chart $C_1$. The input of selecting one category may be achieved by, for example, an operation of touching any of areas associated with a plurality of categories on the pie chart $C_1$, or may be achieved by other means.

The display control unit 14 can display, on the display unit 17, information indicating a product that belongs to a selected category among products included in the list, in response to the input accepted by the input acceptance unit 11. For example, the display control unit 14 may switch a screen displayed on the display unit 17 from the screen illustrated in FIG. 2 to a screen illustrated in FIG. 5, in response to an input of selecting one category. In the screen illustrated in FIG. 5, a list by category in which products belonging to a selected category are listed is displayed. In a case of this example, the screen returns to the screen in FIG. 2 in response to touching of a button $D_1$ illustrated in FIG. 5.

Figure 6:
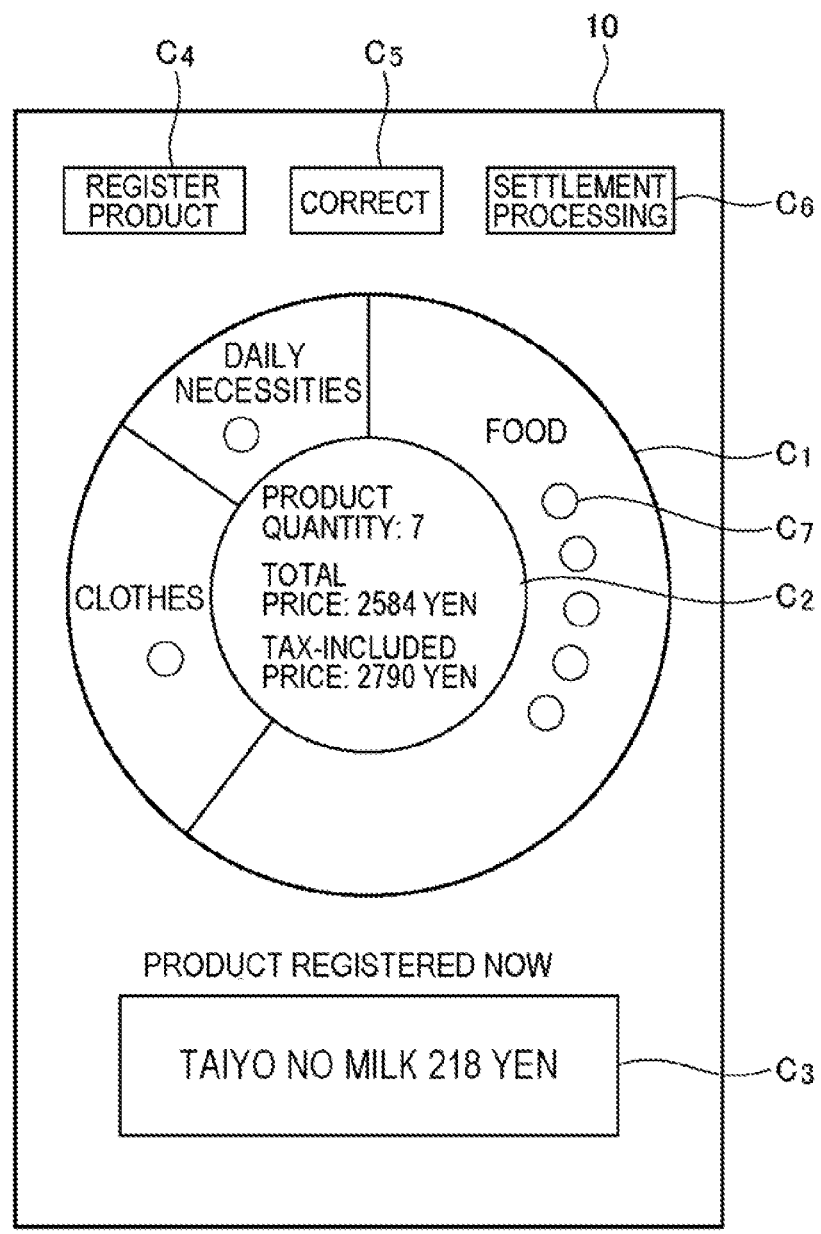
FIG. 6 is a diagram illustrating another example of a screen displayed on the display by the portable terminal.
Figure 7:
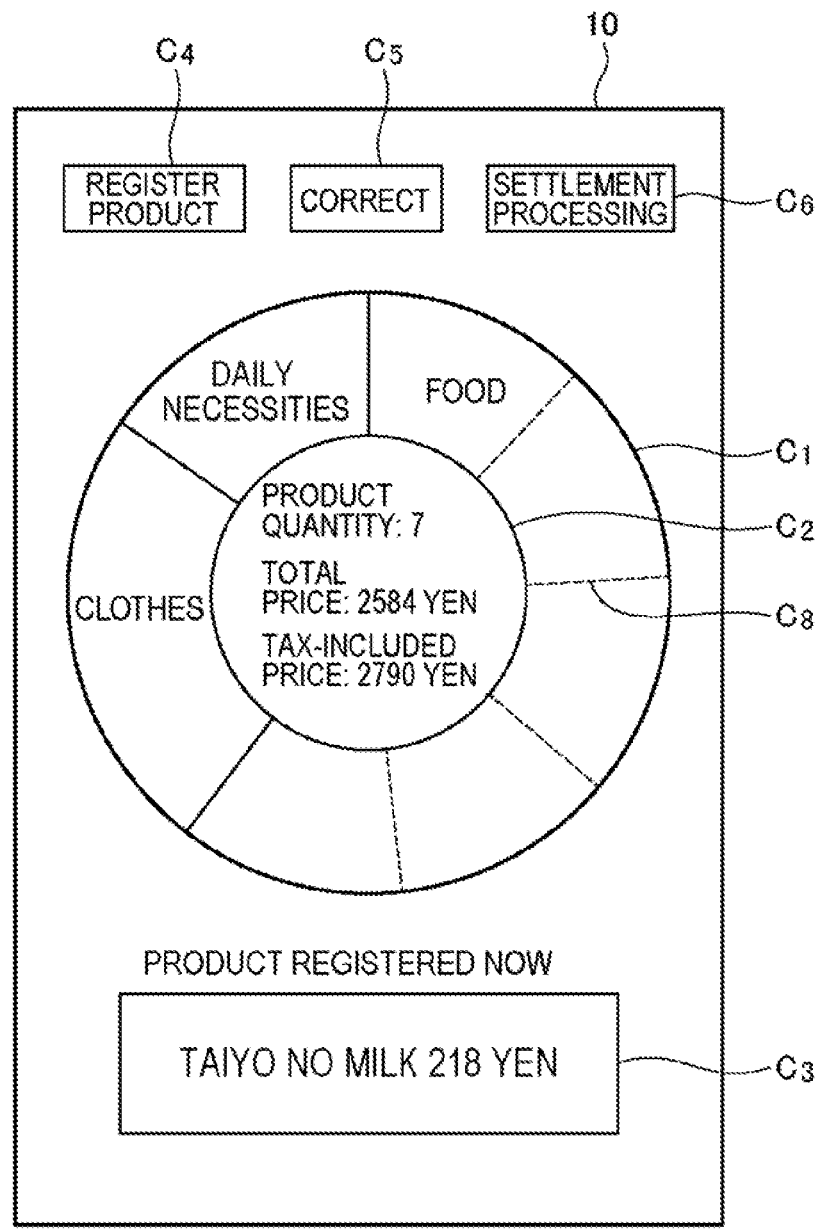
FIG. 7 is a diagram illustrating another example of a screen displayed on the display by the portable terminal.

Further, the graph generation unit 13 may generate the pie chart $C_1$ in which information indicating a purchase quantity of each category of the pie chart $C_1$ is displayed in an area associated with the category. For example, marks $C_7$ as many as a purchase quantity may be displayed in an area associated with each category of the pie chart $C_1$, as illustrated in FIG. 6. Besides the above, an area associated with each category of the pie chart $C_1$ may be partitioned by a partitioning line $C_8$ into rooms as many as a purchase quantity, as illustrated in FIG. 7. Besides the above, a numerical value or character information indicating a purchase quantity may be displayed in an area associated with each category of the pie chart $C_1$, although not illustrated.

Further, the input acceptance unit 11 may accept an input of selecting a way of classification of a product. Then, the display control unit 14 may switch a content of the graph to be displayed on the display unit 17 in response to the selection. For example, although a product included in the list is classified by product category in FIG. 2, a user may be able to perform an input of selecting any of "classify into two categories of food and non-food", "classify into two categories of a special sale product and a non-special sale product", and "classify into a plurality of categories according to a selling price" in this display state. Then, in response to the input, the display control unit 14 may switch a content of the graph to be displayed on the display unit 17 from classification by product category to classification in a selected way.

Further, the input acceptance unit 11 may accept an input of switching a display content of the pie chart $C_1$ between a proportion of purchase prices and a proportion of purchase quantities. Then, the display control unit 14 may switch a content of the graph to be displayed on the display unit 17 in response to the input.

Herein, processing of correcting the list started in response to, for example, touching of the correction button $C_5$ will be described.

Correction of the list is deletion or the like of a product included in the list. For example, the display control unit 14 displays, on the display unit 17, a screen inquiring a content of correction (deletion or the like) and which category is to be corrected, in response to touching of the correction button $C_5$. The input acceptance unit 11 accepts an answer for the inquiry. Then, after an answer for the inquiry is accepted, the display control unit 14 displays, on the display unit 17, a list by category in which products belonging to a selected category are listed. Then, the input acceptance unit 11 accepts an input of selecting a product to be corrected from the list. The list generation unit 12 updates a content of the list, based on an input content accepted in the above processing.

Note that, deletion from the list may be selectable on a product basis as described above, or may be selectable on a category basis. That is, the input acceptance unit 11 may accept a deletion input of selecting one or a plurality of categories from among a plurality of categories displayed in the pie chart $C_1$, and deleting the selected category from the list. Then, the list generation unit 12 may delete all products belonging to the selected categories from the list, based on the deletion input.

Next, settlement processing started in response to, for example, touching of the settlement processing button $C_6$ will be described.

The portable terminal 10 can execute, as settlement processing, at least one of following pieces of processing 1 to 5.

—Processing 1—

The portable terminal 10 generates, as settlement processing, a two-dimensional code indicating a content of the list, specifically, product identification information, a product name, a unit price, a quantity, and the like of a product included in the list, and displays the two-dimensional code on the display. Note that, the two-dimensional code may further indicate a total quantity of products included in the list, a total price of products included in the list, a tax-included price being a total price with tax, and the like. A user causes a settlement apparatus installed at a predetermined position in a store to read the two-dimensional code. In this way, the list is input to the settlement apparatus.

The settlement apparatus accepts payment processing for a tax-included price indicated in the input list. The settlement apparatus may be an apparatus assumed to be operated by a store clerk, or may be an apparatus assumed to be operated by a user (customer). The settlement apparatus can accept payment processing by every possible well-known means such as cash payment, credit card payment, point payment, electronic money payment, and code payment.

—Processing 2—

First, an assumption of the example will be described. In the example, a store server manages a list of users. The portable terminal 10 transmits a list generated by the list generation unit 12 to the store server. Then, the store server issues predetermined list identification information, and stores the received list in association with the list identification information. Further, the store server transmits the issued list identification information to the portable terminal 10. When the list is updated, the portable terminal 10 transmits information indicating a content of update or an updated list to the store server together with the list identification information. In this way, a content of the list managed by the portable terminal 10 is synchronized with a content of the list managed by the store server.

Then, the portable terminal 10 generates, as settlement processing, a code (a barcode, a two-dimensional code, or the like) indicating list identification information, and displays the code on the display. A user causes a settlement apparatus installed at a predetermined position in a store to read the code. Thereafter, the settlement apparatus transmits a request for a list associated with the acquired list identification information to the store server. The store server extracts a list associated with the list identification information transmitted from the settlement apparatus, and transmits the list to the settlement apparatus. In this way, the list is input to the settlement apparatus.

The settlement apparatus accepts payment processing for a tax-included price indicated in the input list. The settlement apparatus may be an apparatus assumed to be operated by a store clerk, or may be an apparatus assumed to be operated by a user (customer). The settlement apparatus can accept payment processing by every possible well-known means such as cash payment, credit card payment, point payment, electronic money payment, and code payment.

—Processing 3—

The portable terminal 10 communicates with a server of a credit card company by using preliminarily registered or newly input credit card information, and executes payment processing for a tax-included price indicated in the list.

—Processing 4—

The portable terminal 10 communicates with a server that manages points by using preliminarily registered or newly input information (user identification information or the like) relevant to points, and executes payment processing for a tax-included price indicated in the list.

—Processing 5—

The portable terminal 10 communicates with a server that manages electronic money by using preliminarily registered or newly input information (user identification information or the like) relevant to electronic money, and executes payment processing for a tax-included price indicated in the list.

Figure 8:
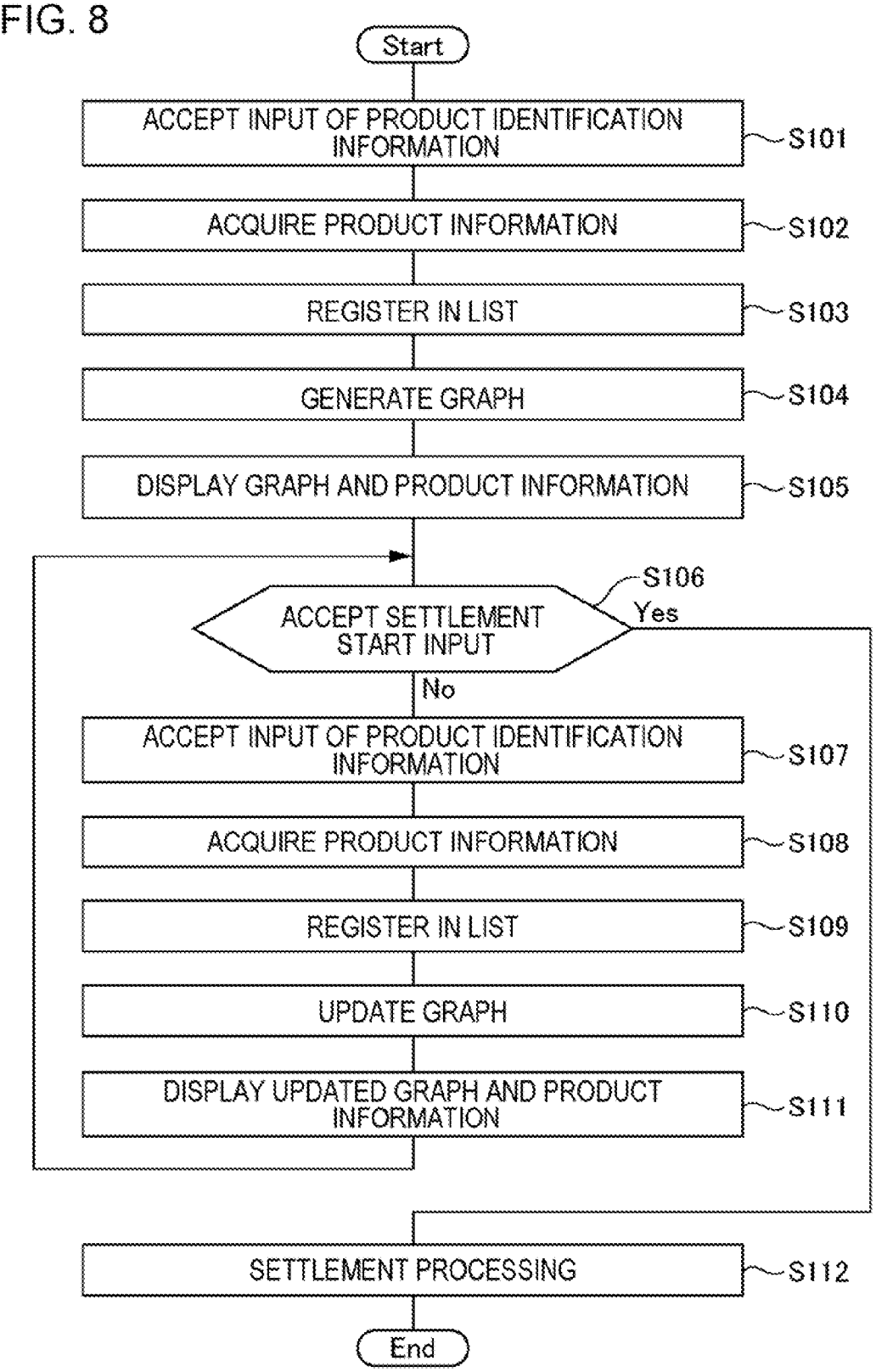
FIG. 8 is a flowchart illustrating one example of a flow of processing of the terminal apparatus.

Next, one example of a flow of processing of the portable terminal 10 will be described by using a flowchart in FIG. 8.

When accepting an input of product identification information of a product to be settled (S101), the portable terminal 10 transmits, to a store server, a request for product information associated with the product identification information. Then, when acquiring product information transmitted from the store server (S102), the portable terminal 10 registers the acquired product information in a list (see FIG. 4) of products to be settled (S103).

Subsequently, the portable terminal 10 generates a graph relating to a content of the list, based on the latest list (S104), and thereafter displays, on the display, a screen (see FIG. 2) indicating the generated graph and at least a part of the product information newly registered in the list (S105).

Thereafter, when accepting an input of starting settlement processing (Yes in S106), the portable terminal 10 executes settlement processing (S112).

On the other hand, when not accepting an input of starting settlement processing (No in S106), the portable terminal 10 can accept an input of product identification information of a new product to be settled (S107). Then, the portable terminal 10 acquires, through processing similar to the above, product information associated with the input product identification information from the store server (S108), and registers the acquired product information in the list (see FIG. 4) of products to be settled (S109).

Subsequently, the portable terminal 10 updates a content of the graph, based on the latest list (S110), and displays, on the display, a screen (see FIG. 2) indicating the updated graph and at least a part of the product information newly registered in the list (S111). Thereafter, the portable terminal 10 returns to S106 and repeats similar processing.

"Advantageous Effect"

The portable terminal 10 according to the second example embodiment can display, on the display, the pie chart $C_1$ indicating a proportion of purchase prices of a plurality of categories or a proportion of purchase quantities of a plurality of categories as illustrated in FIG. 2, while a user performs registration and settlement processing of a product to be settled. A user can recognize a whole picture of a content of registration, based on the pie chart.

Figure 5:
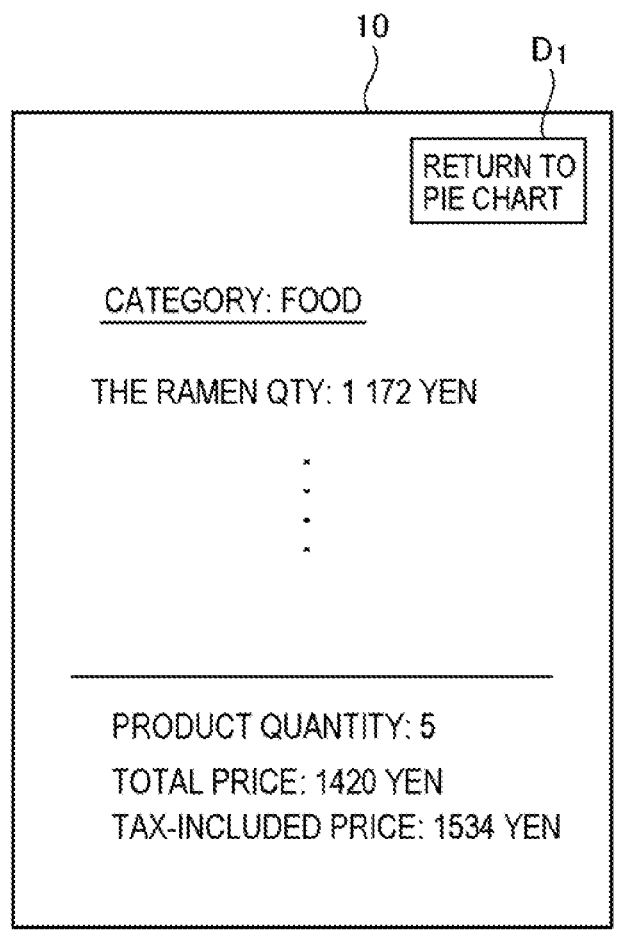
FIG. 5 is a diagram illustrating another example of a screen displayed on the display by the portable terminal.

Further, the portable terminal 10 can display, on the display, a list by category in which products belonging to a selected category are listed, as illustrated in FIG. 5. The number of products to be listed can be reduced by listing only products belonging to a selected category, rather than listing all products included in a list. As a result, inconvenience that an amount of information becomes excessive relative to a size of the display can be prevented.

Further, the portable terminal 10 can display, on the display, information indicating a purchase quantity of each category, as illustrated in FIGS. 6 and 7. A user can check, based on the information, for example, whether all of products added to a cart are registered.

Further, the portable terminal 10 can delete a product from a list on a category basis. Some users may feel annoyed with processing of selecting and deleting a product individually. The portable terminal 10 that can delete a product from a list collectively on a category basis improves efficiency in processing of correcting the list.

Third Example Embodiment

A portable terminal 10 according to a third example embodiment accepts an input of product identification information of a product to be settled, and accepts an input of specifying which person the product is registered as a product intended for. Then, the portable terminal 10 classifies a product included in a list into a plurality of categories according to which person the product is intended for, and generates, based on a result of classification, a pie chart $C_1$ as described in the second example embodiment. Hereinafter, description will be given in detail.

The input acceptance unit 11 accepts an input of product identification information of a product to be settled, and accepts an input of specifying which person the product is registered as a product intended for. Then, the list generation unit 12 registers, in a list, product information associated with the newly input product identification information in association with the specified person.

Figure 9:
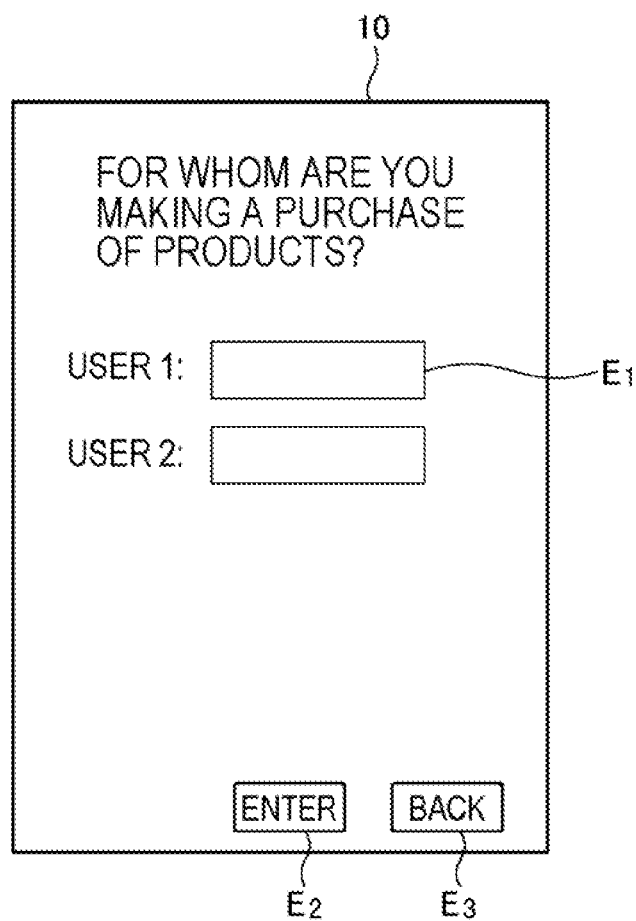
FIG. 9 is a diagram illustrating another example of a screen displayed on the display by the portable terminal.

For example, the portable terminal 10 displays, on a display, a screen as illustrated in FIG. 9 at any timing. Then, the input acceptance unit 11 accepts, via the screen, pre-registration of specifying which person a product being purchased in this shopping is intended for. In the illustrated example, registration is performed by inputting a person name in an input field $E_1$. The person name to be registered may be any name that is identifiable by a user, and may be, for example, a full name, may be a nickname, may be a name indicating a relationship with a user such as "mother, father, me, friend, eldest son, eldest daughter, colleague", or may be others.

Then, when a plurality of persons are registered in pre-registration, the input acceptance unit 11 accepts an input of selecting one of the plurality of persons registered by the above approach every time new product identification information is input. Then, the list generation unit 12 registers, in a list, product information associated with the newly input product identification information in association with the selected person, as illustrated in FIG. 10. The selected person is registered in a field of "for whom" in an illustrated list.

Note that, when one person is registered in pre-registration, the input acceptance unit 11 may not execute processing of accepting an input of specifying which person each product is registered as a product intended for (such as displaying a UI screen and accepting an input of an answer).

The graph generation unit 13 can execute at least one of:
processing of classifying a product included in the list by product category;
processing of classifying a product included in the list into two categories of food and non-food;
processing of classifying a product included in the list into two categories of a special sale product and a non-special sale product;
processing of classifying a product included in the list into a plurality of categories according to a selling price; and
processing of classifying a product included in the list into a plurality of categories according to which person the product is intended for.

Classification into "a plurality of categories according to which person the product is intended for" is performed according to whom the product is intended for, such as, for example, "a product intended for father", "a product intended for mother", or "a product intended for me".

Figure 11:
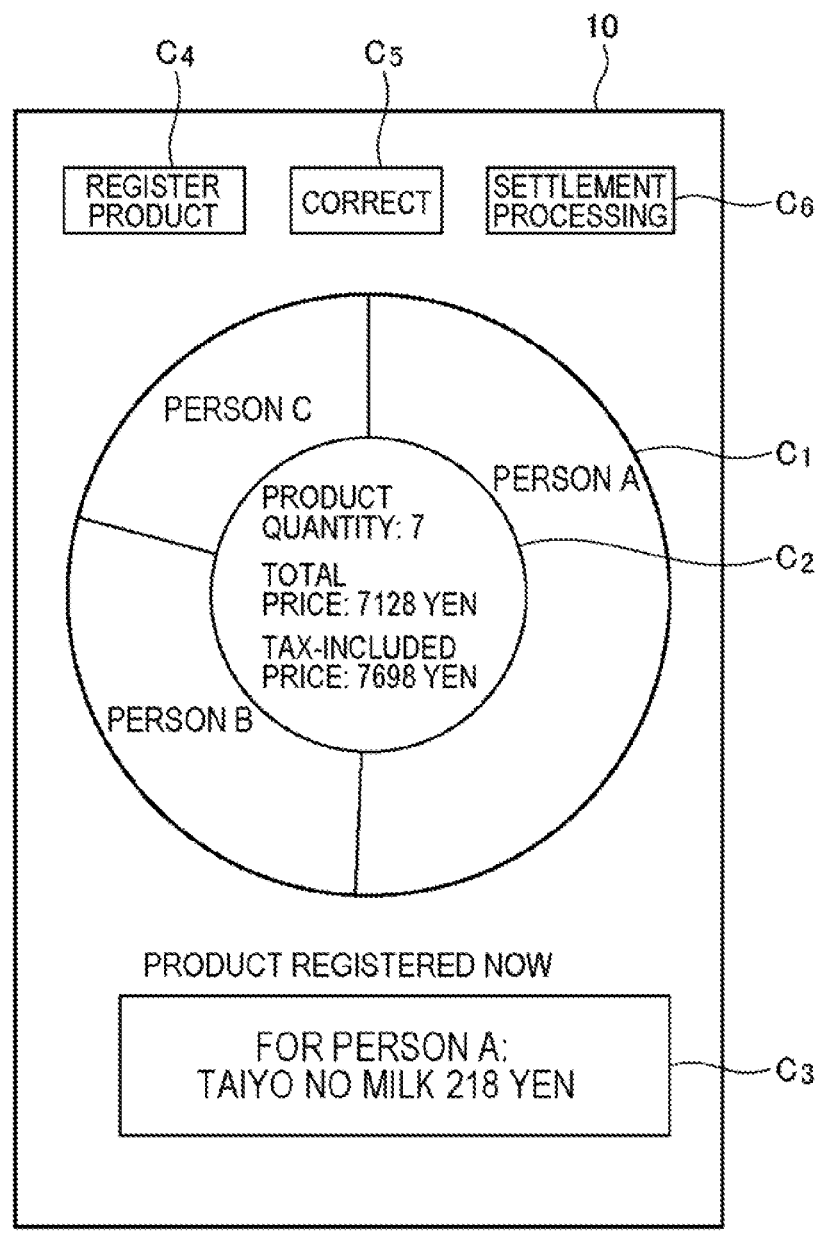
FIG. 11 is a diagram illustrating another example of a screen displayed on the display by the portable terminal.

The graph generation unit 13 as described above can classify a product included in a list into a plurality of categories according to which person the product is intended for, and can generate the pie chart $C_1$ indicating a proportion of purchase prices of a plurality of categories or a proportion of purchase quantities of a plurality of categories, as illustrated in FIG. 11.

Further, the graph generation unit 13 may classify a product intended for each person into a plurality of categories by an approach different from an approach of classification according to which person the product is intended for. Then, the graph generation unit 13 may indicate, in an area associated with each of a plurality of persons of the pie chart $C_1$, a proportion of purchase prices or a proportion of purchase quantities of a plurality of categories classified by the above different approach, as illustrated in FIG. 12.

The above different approach includes any of:
processing of classifying a product included in the list by product category;
processing of classifying a product included in the list into two categories of food and non-food;
processing of classifying a product included in the list into two categories of a special sale product and a non-special sale product; and
processing of classifying a product included in the list into a plurality of categories according to a selling price. In the example in FIG. 12, "processing of classifying a product included in the list by product category" is employed.

As other examples, the graph generation unit 13 may generate the pie chart $C_1$ as illustrated in FIG. 2 for each person. That is, when M persons are registered in pre-registration, the graph generation unit 13 may generate M pie charts $C_1$. M is an integer equal to or more than 2. Then, the display control unit 14 may generate a screen indicating the M pie charts $C_1$ and may display the screen on a display unit 17. The M pie charts $C_1$ may be displayed side by side in one screen, or may be displayed one by one in a screen while being switched according to a user operation.

Figure 12:
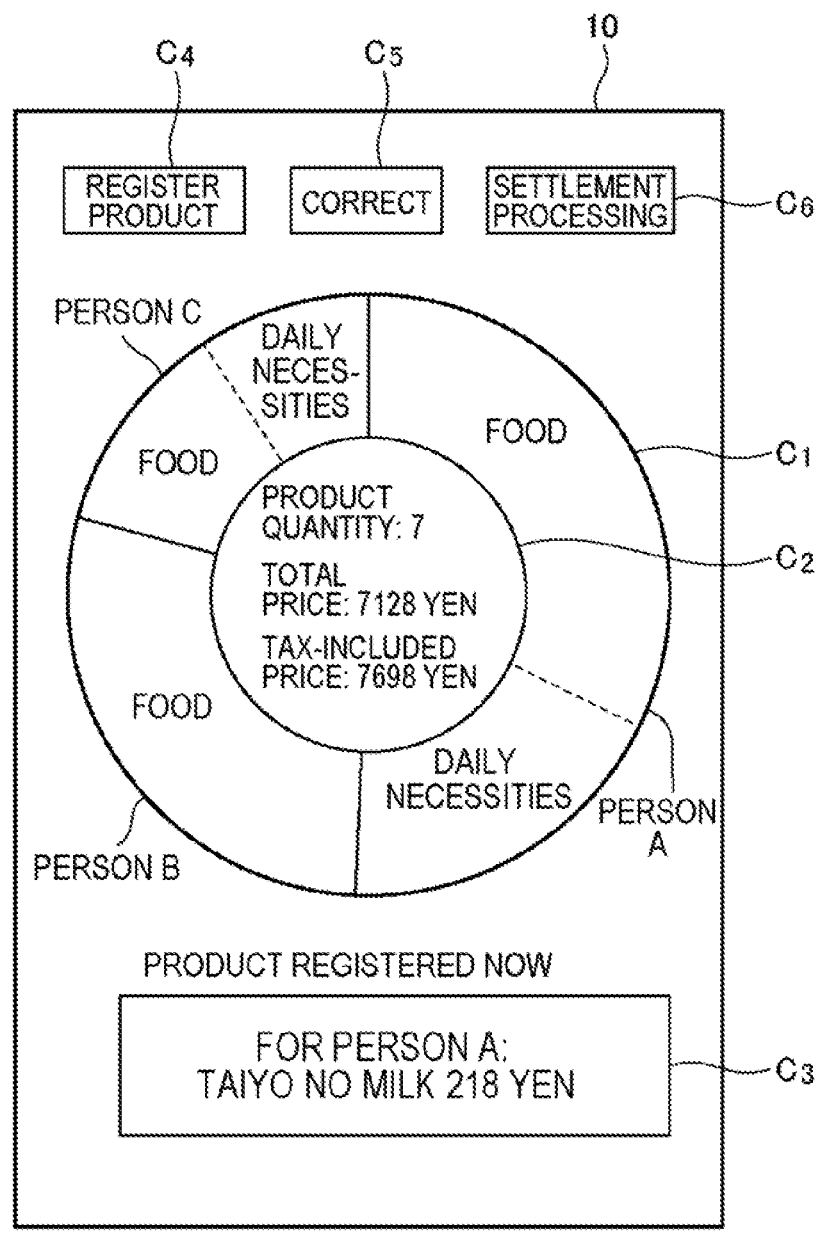
FIG. 12 is a diagram illustrating another example of a screen displayed on the display by the portable terminal.

Further, the display control unit 14 may switch, according to a user operation, a screen displayed on the display between a screen illustrated in FIG. 11 or 12 and a screen in which the M pie charts $C_1$ are displayed side by side in one screen.

Besides the above, the input acceptance unit 11 may accept an input of selecting one person in a screen illustrated in FIGS. 11 and 12. Then, according to the input, the display control unit 14 may display, on the display unit 17, a screen in which a content of registration of a product intended for the selected person is displayed by the pie chart $C_1$ described in the second example embodiment.

In settlement processing according to the present example embodiment, the portable terminal 10 may be capable of executing settlement processing separately for each product to be settled intended for each person.

That is, the portable terminal 10 may generate, as settlement processing, a plurality of two-dimensional codes indicating product information of a product to be settled intended for each person, and may display the two-dimensional codes sequentially on the display.

Besides the above, the portable terminal 10 may communicate with a server of a credit card company by using preliminarily registered or newly input credit card information of each person, and may execute payment processing for each product to be settled intended for each person.

Besides the above, the portable terminal 10 may communicate with a server that manages points by using preliminarily registered or newly input information (user identification information or the like) of each person relevant to points, and may execute payment processing for each product to be settled intended for each person.

Besides the above, the portable terminal 10 may communicate with a server that manages electronic money by using preliminarily registered or newly input information (user identification information or the like) of each person relevant to electronic money, and may execute payment processing for each product to be settled intended for each person.

Other configurations of the portable terminal 10 according to the present example embodiment are similar to the configurations of the portable terminal 10 according to the first and second example embodiments.

The portable terminal 10 according to the present example embodiment achieves an advantageous effect similar to the portable terminal 10 according to the first and second example embodiments.

Further, the portable terminal 10 according to the present example embodiment can classify a product to be settled into a plurality of categories according to which person the product is intended for, can generate the pie chart $C_1$ indicating a proportion of purchase prices of a plurality of categories or a proportion of purchase quantities of a plurality of categories, and can display the pie chart $C_1$ on the display. For example, when the function is used in a case of coming shopping with a plurality of persons, coming to buy a product intended for a plurality of persons, or the like, a user can classify and recognize a product registered as a product to be settled according to which person the product is intended for.

Fourth Example Embodiment

A portable terminal 10 according to a present example embodiment has a function of determining whether a content of a list satisfies a condition preliminarily registered by a user, and outputting warning information when the condition is not satisfied. Hereinafter, description will be given in detail.

Figure 13:
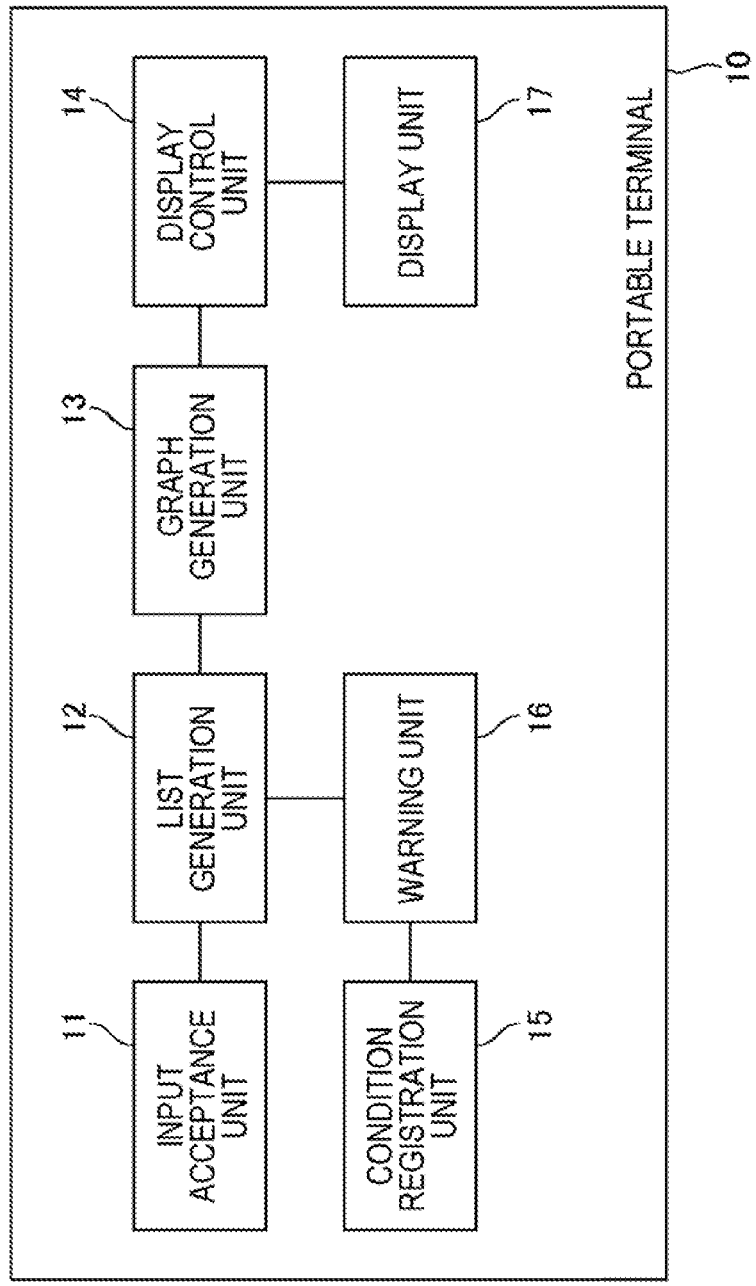
FIG. 13 is a diagram illustrating another example of a function block diagram of the portable terminal.

FIG. 13 illustrates one example of a function block diagram of the portable terminal 10 according to the present example embodiment. As illustrated, the portable terminal 10 includes an input acceptance unit 11, a list generation unit 12, a graph generation unit 13, a display control unit 14, a condition registration unit 15, and a warning unit 16. The portable terminal 10 can further include a display unit 17.

The condition registration unit 15 registers at least one of a condition by category relating to a purchase price or a purchase quantity and a condition relating to a relative relationship between a plurality of categories relating to a purchase price or a purchase quantity. The registered condition may be registered in a storage apparatus in the portable terminal 10, or may be registered in a server.

As one example of "a condition by category relating to a purchase price", "category: confectionery, condition: 300 yen or under", "category: liquor, condition: 2000 yen or under", or the like is exemplified.

As one example of "a condition by category relating to a purchase quantity", "category: confectionery, condition: 3 items or less", "category: vegetables, condition: 5 items or more", or the like is exemplified.

As one example of "a condition relating to a relative relationship between a plurality of categories relating to a purchase price", "category: seafood, meat, condition: a purchase price for seafood is one third or more of a purchase price for meat" or the like is exemplified.

As one example of "a condition relating to a relative relationship between a plurality of categories relating to a purchase quantity", "category: vegetables, meat, condition: a purchase quantity for vegetables is equal to or more than a purchase quantity for meat" or the like is exemplified.

A content of a condition to be registered is determined by a user. A user preliminarily determines and registers a condition as described above, in consideration of own shopping tendency, a point to be improved, or the like.

The warning unit 16 determines whether a content of a list generated by the list generation unit 12 satisfies the above condition, and performs warning processing when the condition is not satisfied.

The warning unit 16 can notify a user of warning information as warning processing. The warning information may indicate a condition not satisfied and a content of the list associated with the condition. As one example of the warning information, "The condition for confectionery is 3 items or less, but 4 confectionery items are registered in the list." or the like is exemplified. Besides the above, the warning information may indicate a condition not satisfied and an advice for satisfying a condition that is determined based on a content of the list associated with the condition. As one example of the warning information, "2 items short for the purchase quantity for vegetables" or the like is exemplified.

Figure 14:
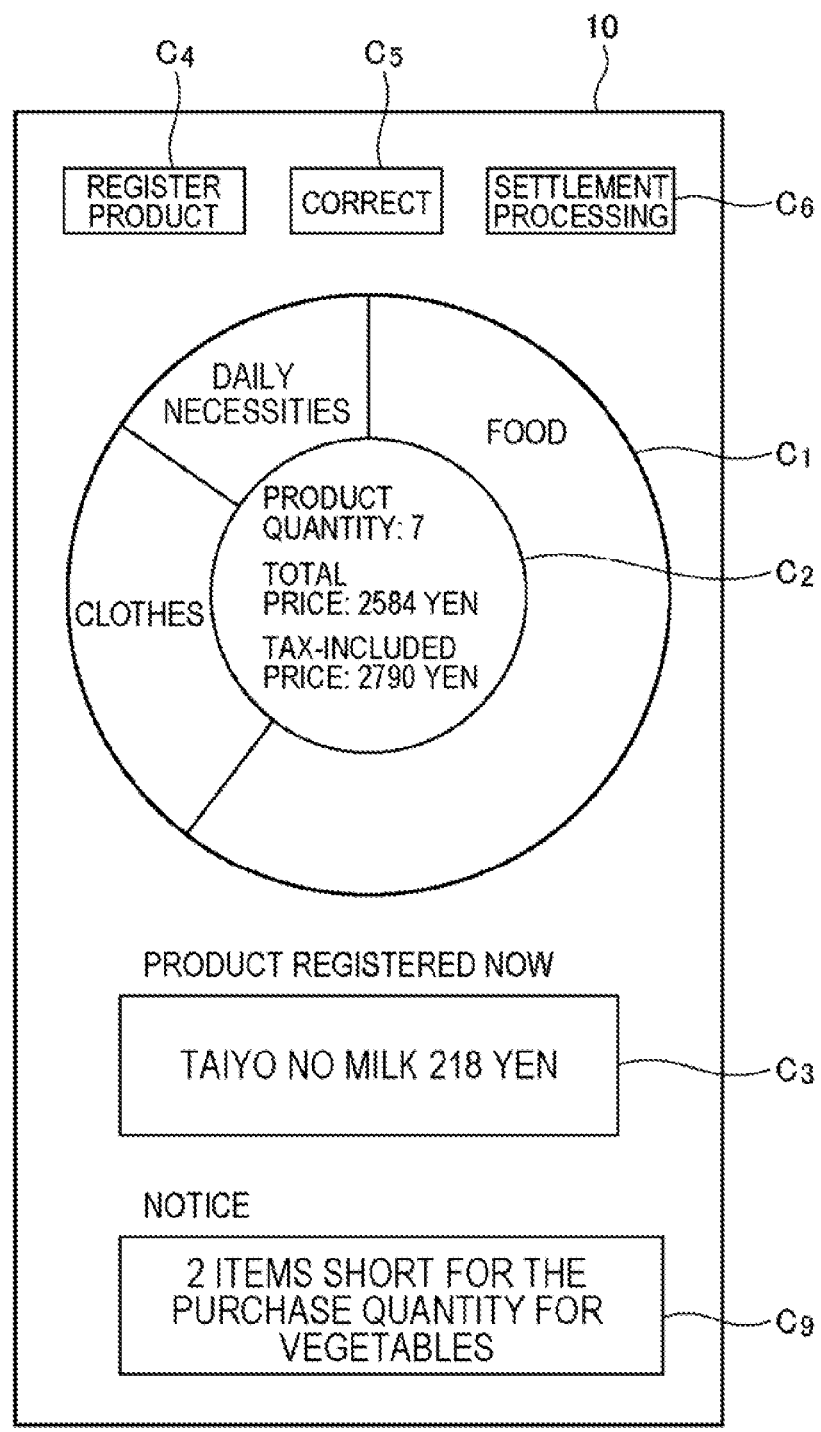
FIG. 14 is a diagram illustrating another example of a screen displayed on the display by the portable terminal.

The warning information is output via a display, a speaker, or the like of the portable terminal 10. For example, the warning information may be displayed on a screen generated by the display control unit 14. FIG. 14 illustrates one example of the example. The warning information is displayed in a space $C_9$.

Besides the above, when a content of the list does not satisfy a condition, the warning unit 16 may determine a product recommended for a user based on a content of the condition not satisfied, and may notify the user of the determined product. For example, when additional purchase of a product of a certain category is necessary due to a reason that a purchase quantity or a purchase price is less than a value determined in a condition or the like, the warning unit 16 may determine a recommended product from among products of the category being handled in a store, and may notify a user of the determined product.

Processing of determining a recommended product from among products of the category being handled in a store can be achieved by a criteria such as, for example, "select a product not included in the list generated by the list generation unit 12", "select a special sale product", or "select a product included in a past purchase history of the user".

Other configurations of the portable terminal 10 according to the present example embodiment are similar to the configurations of the portable terminal 10 according to the first to third example embodiments.

The portable terminal 10 according to the present example embodiment achieves an advantageous effect similar to the portable terminal 10 according to the first to third example embodiments.

Further, the portable terminal 10 according to the present example embodiment can execute warning processing when a content of a list does not satisfy a condition preliminarily determined by a user. The portable terminal 10 as described above can improve user's own shopping tendency.

Fifth Example Embodiment

Figure 15:
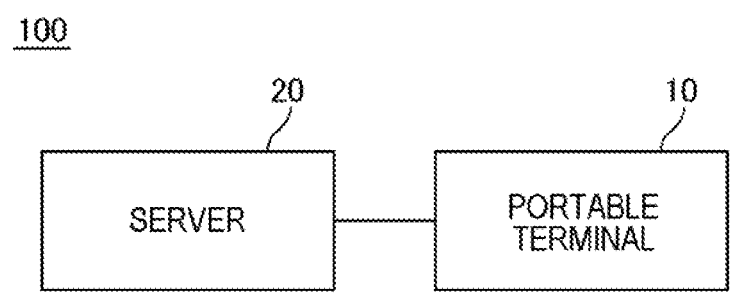
FIG. 15 is a diagram illustrating one example of a function block diagram of a system.

A fifth example embodiment relates to a system that includes a server and a portable terminal 10. FIG. 15 illustrates one example of a function block diagram of a system 100. As illustrated, the system 100 includes a server 20 and the portable terminal 10. One example of a hardware configuration of the server 20 is illustrated in FIG. 3.

In the fifth example embodiment, the portable terminal 10 includes an input acceptance unit 11 and a display unit 17. Then, a list generation unit 12, a graph generation unit 13, and a display control unit 14 are included in any of the portable terminal 10 and the server 20.

Specifically, the system 100 according to the fifth example embodiment is any of following patterns.

The portable terminal 10 includes the input acceptance unit 11 and the display unit 17, and the server 20 includes the list generation unit 12, the graph generation unit 13, and the display control unit 14.

The portable terminal 10 includes the input acceptance unit 11, the list generation unit 12, and the display unit 17, and the server 20 includes the graph generation unit 13 and the display control unit 14.

The portable terminal 10 includes the input acceptance unit 11, the graph generation unit 13, and the display unit 17, and the server 20 includes the list generation unit 12 and the display control unit 14.

The portable terminal 10 includes the input acceptance unit 11, the display control unit 14, and the display unit 17, and the server 20 includes the list generation unit 12 and the graph generation unit 13.

The portable terminal 10 includes the input acceptance unit 11, the list generation unit 12, the graph generation unit 13, and the display unit 17, and the server 20 includes the display control unit 14.

The portable terminal 10 includes the input acceptance unit 11, the list generation unit 12, the display control unit 14, and the display unit 17, and the server 20 includes the graph generation unit 13.

The portable terminal 10 includes the input acceptance unit 11, the graph generation unit 13, the display control unit 14, and the display unit 17, and the server 20 includes the list generation unit 12.

Note that, the system 100 according to the fifth example embodiment may further include a condition registration unit 15 and a warning unit 16. The condition registration unit 15 and the warning unit 16 are included in any of the portable terminal 10 and the server 20.

Specifically, when the system 100 according to the fifth example embodiment includes the condition registration unit 15 and the warning unit 16, the system 100 is any of following patterns.

The portable terminal 10 includes the condition registration unit 15 and the warning unit 16.

The portable terminal 10 includes the condition registration unit 15, and the server 20 includes the warning unit 16.

The portable terminal 10 includes the warning unit 16, and the server 20 includes the condition registration unit 15.

The server 20 includes the condition registration unit 15 and the warning unit 16.

A configuration of each function unit is as described in the first to fourth example embodiments.

The system 100 according to the fifth example embodiment achieves an advantageous effect similar to the portable terminal 10 according to the first to fourth example embodiments.

Modified Example

In the above example embodiment, the graph generation unit 13 generates the pie chart $C_1$ as a graph relating to a content of a list, but may indicate a proportion of purchase prices or a proportion of purchase quantities of a plurality of categories by means of other graphs such as a band graph, a bar graph, and a radar chart.

While the example embodiments of the present invention have been described above with reference to the drawings, the example embodiments are exemplifications of the present invention, and various configurations other than the above can be employed. The configurations of the above-described example embodiments may be combined with each another, or a part of the configurations may be replaced with another configuration. Further, various modifications may be applied to the configurations of the above-described example embodiments, as long as such modifications do not depart from the gist. Further, the configurations and processing disclosed in the above-described example embodiments and the modified examples may be combined with each other.

Further, while a plurality of processes (pieces of processing) are described in order in the flowchart used in the above description, execution order of processes executed in each example embodiment is not limited to the described order. The order of the illustrated processes can be changed in each example embodiment, as long as the change does not detract from contents. Further, the above example embodiments can be combined, as long as contents do not contradict each other.

The above example embodiments may also be described in part or in whole as the following supplementary notes, but are not limited thereto.

1. A processing method including,
    by a computer:
    accepting an input of product identification information of a product to be settled;
    generating, based on the input, a list of products to be settled;
    generating a graph relating to a content of the list; and
    displaying a screen including the graph on a display unit.

2. The processing method according to supplementary note 1, wherein the graph is a pie chart.

3. The processing method according to supplementary note 2, further including, by the computer:
    classifying a product included in the list into a plurality of categories; and generating the pie chart indicating a proportion of purchase prices of a plurality of the categories.

4. The processing method according to supplementary note 2, further including, by the computer:
    classifying a product included in the list into a plurality of categories; and generating the pie chart indicating a proportion of purchase quantities of a plurality of the categories.

5. The processing method according to supplementary note 3 or 4, further including, by the computer,
displaying, in an area associated with each of the categories of the pie chart, information indicating a purchase quantity of each of the categories.
6. The processing method according to any one of supplementary notes 3 to 5, further including,
by the computer,
executing at least one of
processing of classifying a product included in the list by product category,
processing of classifying a product included in the list into two categories of food and non-food,
processing of classifying a product included in the list into two categories of a special sale product and a non-special sale product, and
processing of classifying a product included in the list into a plurality of categories according to a selling price.
7. The processing method according to any one of supplementary notes 3 to 6, further including,
by the computer:
further accepting an input of specifying which person each product included in the list is intended for; and
classifying a product included in the list into a plurality of categories according to which person the product is intended for.
8. The processing method according to supplementary note 7, further including,
by the computer:
classifying a product intended for each person into a plurality of categories by an approach different from an approach of classification according to which person the product is intended for; and
indicating, in an area associated with each of the persons of the pie chart, a proportion of purchase prices or a proportion of purchase quantities of a plurality of categories classified by the different approach.
9. The processing method according to any one of supplementary notes 3 to 8, further including,
by the computer:
further accepting an input of selecting one of a plurality of the categories; and displaying, on the display unit, information indicating a product belonging to the selected category among products included in the list.
10. The processing method according to any one of supplementary notes 3 to 9, further including,
by the computer:
further accepting a deletion input of selecting one or a plurality of categories among a plurality of the categories and deleting the selected category from the list; and
deleting a product belonging to the selected category from the list, based on the deletion input.
11. The processing method according to any one of supplementary notes 1 to 10, further including,
by the computer:
registering at least one of a condition by the category relating to a purchase price or a purchase quantity, and a condition relating to a relative relationship between a plurality of the categories relating to a purchase price or a purchase quantity, and
determining whether a content of the list satisfies the condition, and performing warning processing when the condition is not satisfied.
12. The processing method according to supplementary note 11, further including,
by the computer,
determining, when a content of the list does not satisfy the condition, a product recommended for a user based on a content of the condition not satisfied, and notifying the user of the determined product.
13. A portable terminal including:
an input acceptance unit for accepting an input of product identification information of a product to be settled;
a list generation unit for generating, based on the input, a list of products to be settled;
a graph generation unit for generating a graph relating to a content of the list; and
a display control unit for displaying a screen including the graph on a display unit.
14. A program causing a computer to function as:
an input acceptance unit for accepting an input of product identification information of a product to be settled;
a list generation unit for generating, based on the input, a list of products to be settled;
a graph generation unit for generating a graph relating to a content of the list; and
a display control unit for displaying a screen including the graph on a display unit.
15. A system including:
an input acceptance unit for accepting an input of product identification information of a product to be settled;
a list generation unit for generating, based on the input, a list of products to be settled;
a graph generation unit for generating a graph relating to a content of the list; and
a display control unit for displaying a screen including the graph on a display unit.

REFERENCE SIGNS LIST

10 Portable terminal
11 Input acceptance unit
12 List generation unit
13 Graph generation unit
14 Display control unit
15 Condition registration unit
16 Warning unit
17 Display unit
20 Server
100 System
1A Processor
2A Memory
3A Input/output I/F
4A Peripheral circuit
5A Bus

The invention claimed is:
1. A processing method comprising, by a computer:
accepting an input of product identification information of a product to be settled;
generating, based on the input, a list of products to be settled;
generating a graph relating to a content of the list, wherein the graph is a pie chart;
displaying a screen including the graph on display unit;
classifying a product included in the list into a plurality of categories; and wherein the computer executes at least one of:

processing of classifying a product included in the list into two categories of food and non-food,
processing of classifying a product included in the list into two categories of a special sale product and a non-special sale product, and
processing of classifying a product included in the list into a plurality of categories according to a selling price; and
generates and displays the pie chart indicating a proportion of purchase prices of a plurality of the categories, or a proportion of purchase quantities of a plurality of the categories.

2. The processing method according to claim 1, further comprising, by the computer:
classifying a product included in the list into a plurality of categories; and
generating the pie chart indicating a proportion of purchase quantities of a plurality of the categories.

3. The processing method according to claim 1, further comprising,
by the computer,
displaying, in an area associated with each of the categories of the pie chart, information indicating a purchase quantity of each of the categories.

4. The processing method according to claim 1, further comprising,
by the computer:
further accepting an input of specifying which person each product included in the list is intended for; and
classifying a product included in the list into a plurality of categories according to which person the product is intended for.

5. The processing method according to claim 4, further comprising,
by the computer:
classifying a product intended for each person into a plurality of categories by an approach different from an approach of classification according to which person the product is intended for; and
indicating, in an area associated with each of the persons of the pie chart, a proportion of purchase prices or a proportion of purchase quantities of a plurality of categories classified by the different approach.

6. The processing method according to claim 1, further comprising,
by the computer:
further accepting an input of selecting one of a plurality of the categories; and
displaying, on the display unit, information indicating a product belonging to the selected category among products included in the list.

7. The processing method according to claim 1, further comprising,
by the computer:
further accepting a deletion input of selecting one or a plurality of categories among a plurality of the categories and deleting the selected category from the list; and
deleting a product belonging to the selected category from the list, based on the deletion input.

8. The processing method according to claim 1, further comprising,
by the computer:
registering at least one of a condition by the category relating to a purchase price or a purchase quantity, and a condition relating to a relative relationship between a plurality of the categories relating to a purchase price or a purchase quantity, and
determining whether a content of the list satisfies the condition, and performing warning processing when the condition is not satisfied.

9. The processing method according to claim 8, further comprising,
by the computer,
determining, when a content of the list does not satisfy the condition, a product recommended for a user, based on a content of the condition not satisfied, and notifying the user of the determined product.

10. The processing method according to claim 1, further comprising,
by the computer:
accepting an input for each product included in the list generated by a first user, the input indicating for whom the first user buys each product,
registering, in association with each product included in the list, information indicating for whom the first user buys each product,
classifying a product included in the list into a plurality of categories according to for whom the first user buys each product, and
generating and displaying the pie chart indicating a proportion of purchase prices of a plurality of the categories, or a proportion of purchase quantities of a plurality of the categories".

11. The processing method according to claim 1, further comprising,
by the computer:
displaying a total price of products included in the list in a part space of the screen,
in response to an input of product identification information, changing information displayed in the part space of the screen from the total price of products to the input product identification information, and
changing information displayed in the part space of the screen from the input product identification information to the total price of products after a predetermined amount of time.

12. A portable terminal comprising:
at least one memory configured to store one or more instructions; and
at least one processor configured to execute the one or more instructions to:
accept an input of product identification information of a product to be settled;
generate, based on the input, a list of products to be settled;
generate a graph relating to a content of the list, wherein the graph is a pie chart; and
display a screen including the graph on display unit;
classify a product included in the list into a plurality of categories; and at least one of:
classify a product included in the list into two categories of food and non-food,
classify a product included in the list into two categories of a special sale product and a non-special sale product, and
classify a product included in the list into a plurality of categories according to a selling price; and
generate and display the pie chart indicating a proportion of purchase prices of a plurality of the categories, or a proportion of purchase quantities of a plurality of the categories.

13. A non-transitory storage medium storing a program causing a computer to:

accept an input of product identification information of a product to be settled;
generate, based on the input, a list of products to be settled;
generate a graph relating to a content of the list, wherein the graph is a pie chart;
display a screen including the graph on display unit;
classify a product included in the list into a plurality of categories; and at least one of:
    classify a product included in the list into two categories of food and non-food,
    classify a product included in the list into two categories of a special sale product and a non-special sale product, and
    classify a product included in the list into a plurality of categories according to a selling price; and
generate and display the pie chart indicating a proportion of purchase prices of a plurality of the categories, or a proportion of purchase quantities of a plurality of the categories.

14. A system comprising:
at least one memory configured to store one or more instructions; and
at least one processor configured to execute the one or more instructions to:
accept an input of product identification information of a product to be settled;
generate, based on the input, a list of products to be settled;
generate a graph relating to a content of the list, wherein the graph is a pie chart; and
display a screen including the graph on display unit;
classify a product included in the list into a plurality of categories; and at least one of:
    classify a product included in the list into two categories of food and non-food,
    classify a product included in the list into two categories of a special sale product and a non-special sale product, and
    classify a product included in the list into a plurality of categories according to a selling price; and
generate and display the pie chart indicating a proportion of purchase prices of a plurality of the categories, or a proportion of purchase quantities of a plurality of the categories.

\* \* \* \* \*